Patented Jan. 9, 1923.

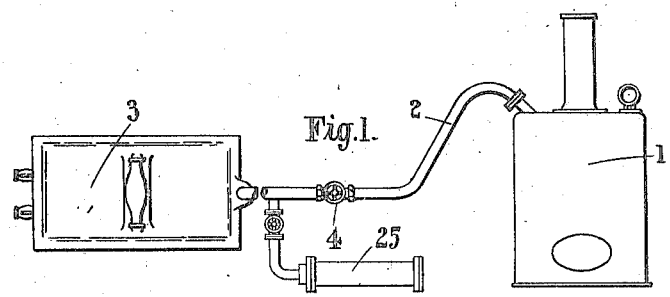
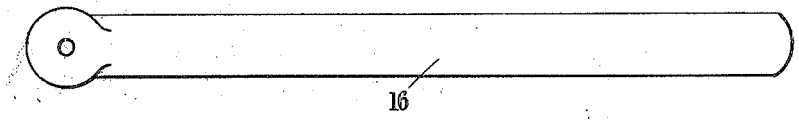
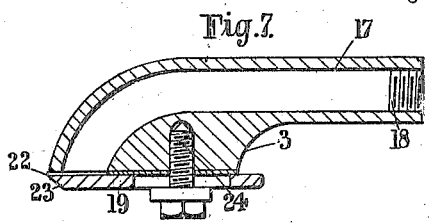 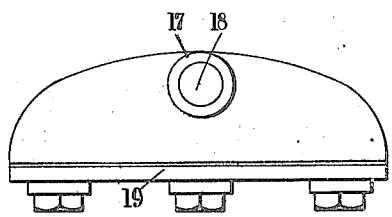
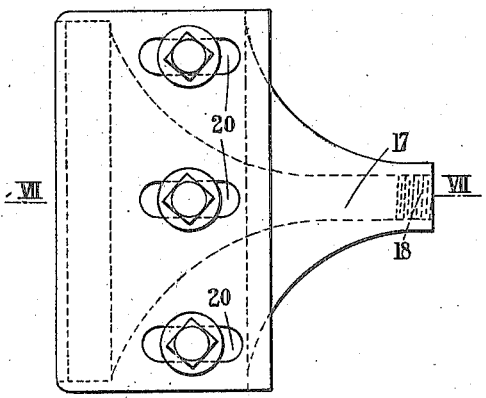

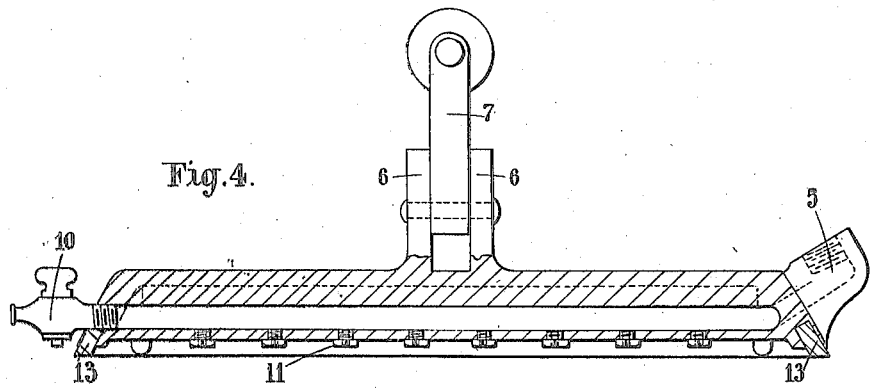
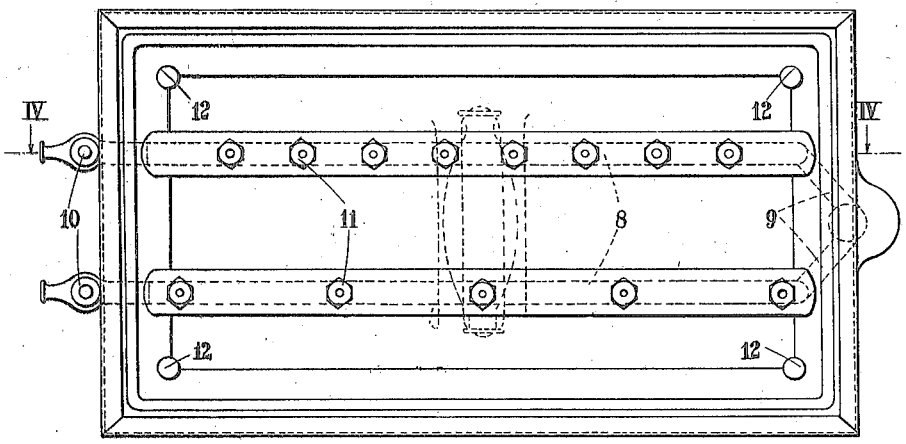
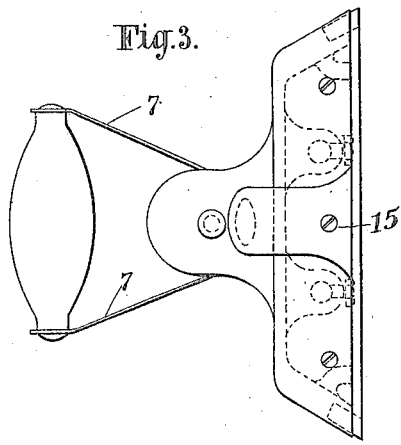

1,441,964

UNITED STATES PATENT OFFICE.

ARCHIBALD CAMPBELL, OF LONDON, AND WALTER LESLIE MILLER, OF ESSEX, ENGLAND.

REDECORATION OF BUILDINGS.

Application filed May 23, 1922. Serial No. 563,109.

*To all whom it may concern:*

Be it known that we, ARCHIBALD CAMPBELL and WALTER LESLIE MILLER, both subjects of the King of Great Britain, residing at London, England, and Essex, England, respectively, have invented certain new and useful Improvements Relating to the Redecoration of Buildings, of which the following is a specification.

Our invention relates to the re-decoration of buildings, or other structures and is especially applicable to interiors.

Our invention has for its main object to provide an improved method of, and means for, the preparation of the interior of buildings, or other structures, prior to re-decoration.

Our invention consists in a method of preparing the interior of buildings, for re-decoration, which consists in leading a supply of steam under pressure, to the operating position and projecting the steam in one or more jets, against the surface to be treated.

Our invention further consists in a device for preparing surfaces for re-decorating, in which device one or more nozzles are formed therein, which are adapted to project steam in jets against the surface to be treated.

Our invention also consists in a device of the type indicated in the preceding paragraph having rubber edges for retaining the water of condensation for the purpose of softening the wall covering, which is being removed.

Our invention further consists in a device of the type indicated, in which the device is provided with means such as one or more cutting edges for removing the covering on the walls after being acted on by the steam.

Our invention also consists in the improved method of and means for preparing the interior of buildings to be hereinafter described.

Referring now to the accompanying drawings, which illustrate our invention and form part of our specification, Figure 1 shows a general arrangement of an installation constructed according to our invention, for preparing interiors of buildings.

Figure 2 shows an inverted plan and Figure 3 shows an end elevation respectively, on an enlarged scale of the device shown in Figure 1, while Figure 4 shows a sectional elevation on the line IV—IV on Figure 2.

Figures 5 and 6 show an alternative form of operating handle, to that shown in Figures 3 and 4.

Figure 7 shows a sectional elevation of a modified form of device, the section being taken on the line VII—VII Figure 9, while Figures 8 and 9 show an end elevation and an inverted plan of the device shown in Figure 7.

In carrying our invention into effect, according to one form, we provide a small portable boiler 1, Figure 1, capable of generating steam under a pressure, for example of sixty pounds per square inch.

From the boiler 1, the steam is led through a flexible pipe 2, to the device 3, a stop valve 4 being provided in a convenient position for regulating the supply of steam to the device 3.

The device 3 according to the form shown in Figures 2 to 4, consists of a casting preferably of aluminium provided with a connection 5, for the flexible steam pipe 2, and having lugs 6 for attaching the manipulating handle 7.

Two longitudinal steam ducts 8 are formed in the device, and at one of their ends communicate with the connection 5, by the ducts 9, while their other ends are provided with drain cocks 10.

In the lower wall of the ducts 8, a number of screwed nozzles 11 are inserted, the size of the orifice of the nozzles, in the present example, being one thirty second of an inch. Nozzles with larger or smaller orifices may be provided if desired.

At each corner of the device, a distance stud 12, is disposed, so that the jets may be retained at the proper distance from the surface being operated upon.

Strips of rubber 13, are inserted in each side, and are retained in position by the screws 15. The rubber strips act to retain the water of condensation and also to act as squeegees.

Instead of the handle 7 in some cases, we may use as an alternative the handle 16, shown in Figures 5 and 6.

On applying our invention to the removal of wall-paper for example, the steam supply is turned on and the device 3 applied to the surface to be operated upon. The steam issues from the nozzles 11, in fine jets, pierces the paper and raises it from the wall. The rubber strips 13 retain the water of condensation which assists in softening the paper. By traversing the device 3, over the wall by means of the handle 7, the paper is divided by the steam jets issuing from the nozzles 11 into a number of narrow strips, which may then be removed from the wall by any suitable means.

In further explanation of the application of the invention as above described, attention is directed to Figs. 1 and 4, from which it will be noted that the ducts 8 are in direct communication with the boiler 1 by the pipe 2 when valve 4 is open, and that the outlets for steam from the ducts 8 are only through the nozzles 11, which are very small. A substantially high pressure of steam may be maintained in the ducts 8 by this construction, and fine jets of substantially cylindrical form having a high velocity will issue from the nozzles and pierce the wall covering. After piercing the wall covering, the jets will impinge against the wall surface and subsequently between the wall and the back of the wall paper between the jets, so that the paper will be separated from the wall. As the device is moved along the wall, these fine jets cut the paper into strips and separate these strips from the wall as above described by the steam passing through the cut portion and entering between the wall and the back of the paper in between the jets for forcing the strips away from the wall.

In some cases, instead of the form of device above described, we may construct it as shown in Figures 7 to 9. In these Figures, the device 3 is provided with a single duct 17, for the steam, the inlet ends being threaded at 18, for connecting up to the pipe 2, while the outlet end of the duct is partially closed by the plate 19.

The plate 19 has three slotted holes 20 formed therein, through which the screws 21 pass, for securing the plate to the device, the width of the orifice 22 through which the steam issues, being determined by the thickness of the lead foil 24, or other material used in jointing the plate 19 to the casting 3.

The orifice is formed by omitting the jointing material along the front edge of the outlet of the duct 17.

The front edge of the plate 19, is bevelled as shown, so that the edge 23 may be used as a scraper for the removal of the paper.

The sectional dimensions of the orifice for the steam may, for example, be about three inches long by one sixty fourth of an inch wide.

On applying this modification of our invention to the removal of wall-paper, the device after the steam has been turned on, is applied to the surface to be operated upon.

As the steam issuing from the device cuts or pierces the wall-paper, the device is manipulated so that the edge 23, acts as a scraper to remove the paper.

The steam used in conjunction with the devices as above described, may be either saturated or superheated. In the latter case, the boiler is provided with means for imparting to the steam the desired degree of superheat. When superheated steam is used in addition to increasing the efficiency of the device, it also acts as an efficient germicide and insecticide.

In some cases we may attach a removable container 25 Figure 1, for a disinfectant under pressure, to the devices as above described, so that the steam will intermingle with disinfectant from the container and spray it on to the walls during the process.

By means of our invention, wall-paper, white-wash, and distemper may be removed from the walls of buildings, in an easy and expeditious manner, while the jets at the same time efficiently disinfect the surfaces.

In the foregoing specification and the claims appended hereto, we have used the term "buildings" in its generic sense, and intend it to include structures both of a permanent and temporary character.

We wish it to be understood that the above examples of our invention, are simply to be regarded as typical only, and not as in any way limiting our invention thereto, as modifications may be made in the dimensions of the orifices and other details without departing beyond the scope of our invention.

We claim:

1. A method of removing wall coverings consisting in leading a supply of elastic fluid under pressure to the operating position and projecting said elastic fluid in one or more jets against the covering being treated so as to pierce the covering, impinge on the wall and subsequently flow between the covering and wall and raise said covering from the walls.

2. A method of removing wall coverings consisting in leading a supply of steam under pressure to the operating position and projecting said steam in one or more jets against the covering being treated so as to pierce the covering, impinge on the wall beneath said covering and flow laterally to the jets along the wall beneath the covering and raise said covering from the walls, as set forth.

3. A method of removing wall coverings consisting in leading a supply of superheated steam to the operating position and projecting said steam in one or more jets against the covering being treated, so as to pierce the covering, impinge on the wall beneath said covering and flow laterally to the jets along the wall beneath the covering and raise said covering from said walls, as set forth.

4. A method of removing wall coverings, consisting in directing a heated moist fluid against the covering along a series of spaced lines, whereby to penetrate such covering along such lines and directing such fluid between said covering and wall surface throughout the area of covering between the lines of penetration.

5. A method of separating wall coverings from the wall surface, consisting in directing a fluid under pressure to pierce such covering to permit such fluid to impinge on the wall surface and be thereafter directed between said covering and wall surface beyond the jet for raising the paper from the wall.

6. A device for removing wall coverings having in combination a source of heated fluid under pressure, a plate having ducts therein, nozzles mounted in the ducts, and a hose for conveying the fluid under pressure to said ducts, whereby the nozzles will confine the fluid directed therethrough in separated jets for piercing the wall covering.

7. A device for removing wall coverings having in combination a source of fluid under pressure, a plate formed with a plurality of ducts, a connection for conveying said fluid to said ducts under pressure, and a plurality of jet nozzles mounted in the plate and communicating with said ducts, whereby when the plate is moved over the wall covering in operation, the jet nozzles will confine the fluid issuing therefrom in fine spaced streams for piercing and removing the covering from the wall.

In testimony whereof we have signed our names to this specification.

ARCHIBALD CAMPBELL.
WALTER LESLIE MILLER.